Patented Aug. 4, 1953

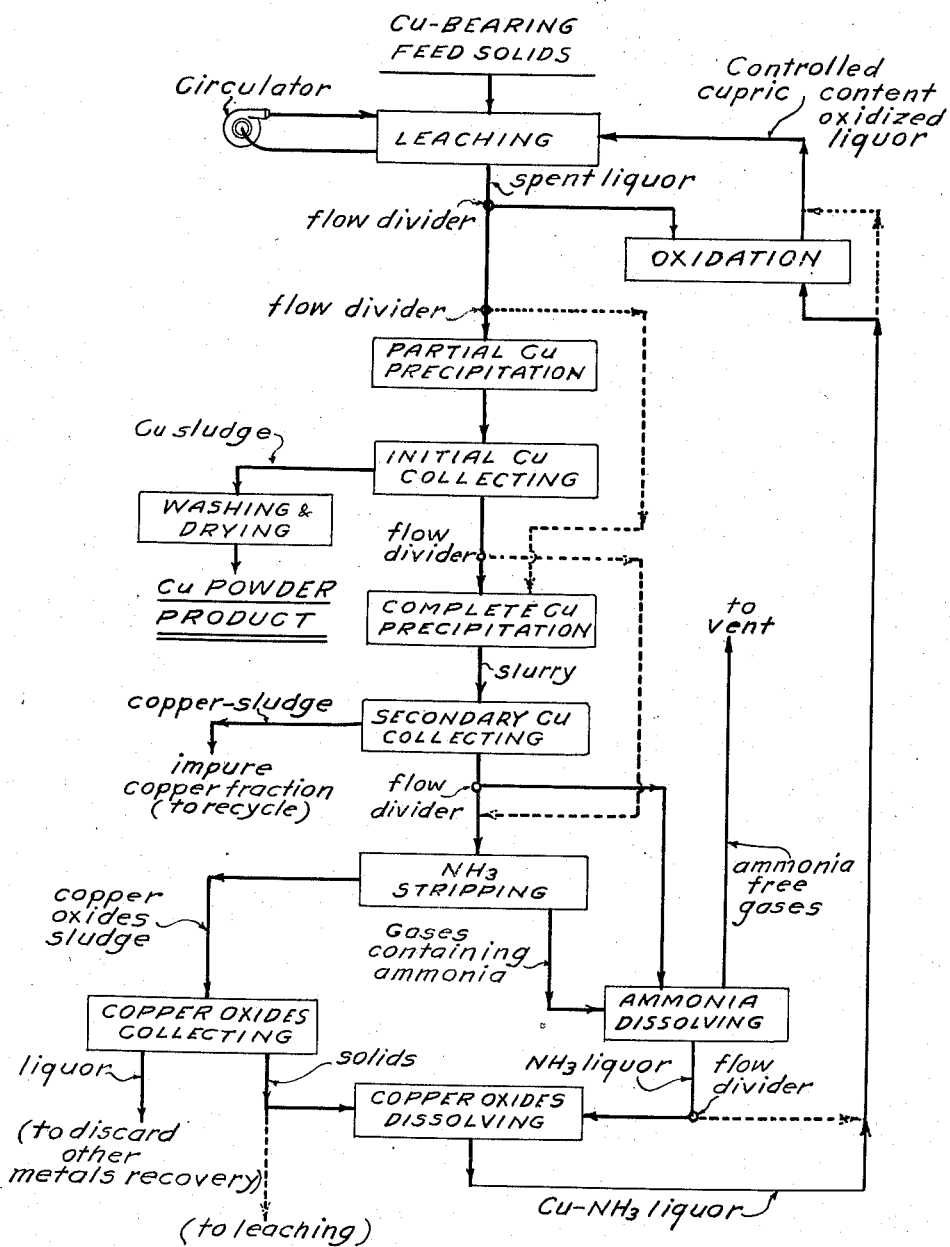

2,647,830

UNITED STATES PATENT OFFICE 2,647,830

PREPARATION OF PURE COPPER METAL FROM COPPER-BEARING SCRAP

Louis N. Allen, Jr., Short Hills, N. J., and Patrick J. McGauley, Glen Cove, and Edward S. Roberts, New York, N. Y., assignors to Chemical Construction Corporation, New York, N. Y., a corporation of Delaware Application December 17, 1949, Serial No. 133,666

16 Claims. (Cl. 75—103)

The present invention relates to the recovery of copper from copper-bearing scrap metal. In particular, it relates to an improved method whereby the copper content of such materials is quickly, simply and easily leached and subsequently recovered.

In recent years the metals trades have been faced with a constantly increasing demand for non-ferrous metals, particularly copper. This has been accompanied by a decrease in the known reserves of high-grade ore and rapidly increasing costs of mining and refining the lower grades. As a result, more and more interest is being displayed in methods for recovering the copper content of copper-bearing scrap metal.

What is probably the best current practice in the field is readily illustrated. Copper-bearing scrap is charged into large leaching vats and flooded with a dilute oxidized solution of ammoniacal copper carbonate. The latter solution is gently circulated through the layer, pumped through an oxidation tower and returned to the leaching tanks. In this manner the copper in solution is alternately oxidized to cupric salts and then returned to the cuprous condition in dissolving more copper. New barren solution is constantly added to the system and the pregnant solution is continuously withdrawn.

As a result, not only copper but zinc and other soluble impurities are gradually dissolved into a collective, relatively dilute solution. The rate of dissolving of the various metals is not the same for each. Copper and zinc will dissolve at approximately the same rate, whereas nickel will dissolve at a somewhat slower rate. Lead will dissolve up to a certain saturation and remain constant. The ammonium carbonate and ammonia are then distilled off and the copper recovered, principally, as impure cuprous oxide. Mother liquor from the system is discarded while the ammonia and carbon dioxide vapors are condensed in water, being reused in the leaching of more scrap.

It will be seen that this process is extremely slow. Leaching of normal copper scrap with these dilute solutions requires that the scrap remain in the leaching tanks for a period of at least three to six weeks. This unreasonably long leaching period requires such a large and expensive inventory of both metal and ammonia in process that the carrying charges become an important item in the total cost of processing. The long leaching period requires an excessive number of leaching tanks, as well as amount of solution and equipment. The relatively dilute leaching solutions dissolve much of the zinc and other impurities which are later precipitated as impurities in the copper oxide product from the still.

Copper oxides precipitated in the still tend to build up on the inside of the vessel and must be periodically removed by hand labor. The high steam requirements of the still are an important part of the cost of the process. The resulting impure copper product must be reduced and refined before it is marketable as commercial copper metal. Lead and zinc impurities are distilled off during the reducing and refining operation. Nickel, however, remains in the copper and to remove it requires an expensive separation process. Therefore, the presence of nickel in substantial quantities, markedly reduces the utility of the resulting impure oxide. Nevertheless, the economy of still operation makes the use of dilute leaching solutions desirable.

It would seem fairly simple to increase the leaching rate. For example, it would appear to be more desirable to increase the concentration of the leaching liquor. However, if this is done, the economy of still operation is radically altered. It becomes such as to offset any economic gain in the shorter time required for leaching.

There remains, therefore, a commercial demand for a process, the utilization of which is not hampered by these drawbacks. It is, accordingly, the principal object of the present invention to devise a method which is faster, easier and more effective. Preferably it should involve the use of no unusual or expensive apparatus and should not involve the necessity for extraordinary or expensive reagents.

In general, the overall objects of the present invention have been effectively accomplished by a combination of modifications of the general practice. One radical modification comprises a marked increase in the concentration and rate of circulation of liquor over the pieces to be leached. A second lies in a novel system for making up and recycling fluid whereby the system is kept in material balance with little or no waste of effective reagents. A third lies in a novel system for reducing the copper content of the leach solution to metallic copper and subsequently purifying this copper to produce a product which is 99.9+% pure.

In view of the fact that in previous practice the rate of leach fluid circulation has been considered irrelevant, the first modification, as applied in the present process is particularly surprising. In the past, it has been thought necessary to circulate the leach fluid only sufficiently to maintain its strength by passing a sufficient amount through the oxidizing tower. In accordance with the present invention, it has been found that the leaching rate is proportional, almost directly within a considerable range, to the concentration of cupric copper in the leach liquor, and is almost directly proportional to a factor which corresponds to the one-third power of the velocity of the fluid over the piece being leached.

Accordingly, in the practice of this invention, the circulation of fluid over the leaching pieces is governed by the desired leaching rate. Flow velocities are maintained many times higher than those previously used. The velocity will ordinarily be as high as practically obtainable with the available apparatus. Increasing this velocity beyond a certain point, however, reaches a point of rapidly diminishing return. Increasing the velocity increases the necessary size of the apparatus and the pumps and other apparatus used to maintain the circulation rate. An economic balance must be taken between the improvement due to increasing the velocity and cost of maintaining such a velocity.

It has been found that a velocity over the surface of the pieces being leached of 0.01–5 feet per second should be used. Higher velocities may be used but pumping costs become excessive. Ordinarily, the most useful practice will range from about 0.05 to 1.0 foot per second, a good average practice being about 0.5 foot per second. Actual operation at these velocities is conducted by the use of a series of tanks. The solution is recirculated within each tank to obtain the desired velocity. The gross quantity of copper being leached per unit of time within a given tank gradually diminishes as the available copper surface decreases. Accordingly, it is desirable to have a plurality of tanks operating simultaneously but each at a different stage in the operation. In this way a substantially constant overall rate of leaching may be maintained.

Several additional factors which affect the leaching range should also be considered. The rate is increased as the temperature is increased. The temperature of operation should be as high as practicable without seriously reducing the solubility of the ammonia. In general practice, however, no attempt should be made to actually increase the temperature of the leach liquor beyond the effluent temperature from the oxidation tower. The latter usually will be 100°–135° F. Precautions should be taken to avoid loss of heat in the oxidation and leaching systems to preserve as high reaction rates as possible.

As noted above, leaching rate is also affected by the amount of cupric copper available in the leaching liquor. This may be varied considerably. In the past, as also noted above, it has been considered economically necessary that the leaching solution be quite dilute. In accordance with the present invention, this is not found necessary. This is due to the fact that the economy of the still operation in the previous practice favored dilute leaching solutions.

In the present invention, as will be brought out below, this is not a serious factor, due to the novel liquor treating and recirculation systems. The strength of the leach liquor may be kept as high as conveniently practicable. However, copper, copper salts or other impurities should not be precipitated in the system at any point except in the reduction vessels where metallic copper is precipitated. Accordingly, it has been found preferable to use a leach liquor initially containing at least 20 but not more than about 100–110 grams of cupric copper per liter. This may go as high as about 175 grams during operation. In general practice this range will be reduced somewhat when appreciably large quantities of zinc are being leached out along with the copper in the leach tanks.

The overall process of the present invention, as was noted, may be roughly divided into three operations. These are the leaching operation, the system for separating copper from the pregnant liquor, and the system for reforming and recirculating the leach liquor. The principal precautions required in the actual leaching step, with which this application is primarily concerned, have been discussed. The remainder of the procedure may be carried out in any desired manner. For the purpose of illustration, a novel operational procedure which may be considered as constituting a series of separate but interlocking steps has been set forth below.

Initially, typical operations will be described below with reference to the treatment of copper scrap which is essentially free from large amount of impurities, usually 90% or better in copper. Necessary deviations from this system caused by the dissolution of and the necessity for the removal therefrom of dissolved metals other than copper, will be then discussed.

Initially the spent leach liquor is divided into two flows. One flow, which will be considered later, is returned for oxidation. The remaining portion is treated to recover the precipitatable copper content. It is this latter operation which next will be considered.

It is believed that the discussion of the invention may be more readily followed in conjunction with the accompanying drawing which is a simplified flow scheme showing the essential features of the process.

This portion of the liquor, i. e., that from which copper is to be recovered, is to be reduced with carbon monoxide, is pumped against pressure into an absorption tower in which it is saturated, as nearly as is practically possible, with carbon monoxide. In conducting this operation the procedural limits may also be varied considerably. First, to improve the absorption rate, the liquor should be cooled to about 90° F. or lower. Pressure in the absorption tower may also be varied considerably in accordance with the possibilities of the available apparatus. It has been found that about 750 to 1250 pounds per square inch is a good practice with the average pressure of about 1000±50 pounds being preferred. This limit, however, is not critical.

As a source of carbon monoxide, many kinds of any available commercial gas may be used. Sulfur is undesirable therein. The pressure of carbon dioxide or nitrogen as diluents have no adverse effect except for the necessary increase in the volumes handled. Producer gas except for the sulfur content which may be removed if necessary is completely satisfactory and its use will be taken as illustrative. Other equivalent and preferable sulfur-free gases include water gas, reformed methane, and the like. During absorption the temperature will rise to about 115° F. to 125° F. Effluent gases, containing nitrogen and the unabsorbed CO and $CO_2$, as well as some ammonia, are further treated with cold water in a packed tower section, also under pressure. The ammonia will be dissolved in this water and the resultant solution is added to the main liquid effluent. The residual inert gases, substantially free from ammonia, may be vented to waste through a suitable reducing valve. They also may be sent alternatively to some suitable power recovery unit.

Under good operating conditions the gas-saturated liquor will contain cuprous copper, cupric copper, carbon monoxide and water in the correct mole ratio to precipitate about 70% of the copper content. As will be brought out, while not an essential limitation, this degree of precipitation does constitute a good average practice. Precipitation is accomplished by transferring the liquor to a suitable pressure vessel and raising its temperature, usually with steam, to above about 250° F., usually 300°–350° F., for carbon monoxide being good practice. The time of treatment will vary with the temperature. Preferably, also, the pressure vessel should be equipped for mechanical stirring, which will markedly improve the rate of reaction. For example, using carbon monoxide a fifteen minute treatment at about 300° F. will constitute a good average practice. Temperatures above about 350° F. with carbon monoxide may be used if so desired; however, to do so is not necessary and will ordinarily be found to unduly increase the apparatus requirements.

Precipitation of copper preferably should be accomplished in a continuous fashion. Steam and pregnant liquor are continually added to the vessel and copper powder slurry and spent liquor continually discharged. The effluent slurry is indirectly cooled to about 150° to 175° F. and the pressure thereon reduced to atmospheric. In this range the vapor pressure of the liquid will be about atmospheric and this constitutes the preferred practice.

Metallic copper is separated from this slurry, then washed and dried. Preferably, this is done using successive washings with ammonia-bearing liquor water, with metallic-lead-dissolving reagent, with metallic-nickel-dissolving reagent and finally with water. Wet copper metal is mechanically dried to the extent found practical, followed by complete drying in a hydrogen atmosphere and heating to about 400° F. The product is pure powdered copper metal containing 99.9+% copper.

The decanted liquid which will contain the residual dissolved copper is combined with the first metal wash liquor which will contain ammonia and in some cases copper and then treated to remove $CO_2$ and $H_2O$ to the extent required to balance the incoming materials to the overall process. This may be done in any of several ways. When copper is substantially the only dissolved metal, the only case thus far discussed, this may be done by an operation that comprises an additional novel feature of the present process. It is useful in this case because the amount of residual dissolved copper will be small. In this operation, approximately one-third of this liquor is treated to strip dissolved gases therefrom. The remainder is used in an absorption treatment of the stripped gases.

Stripping is preferably carried out in a suitable packed tower, at about atmospheric pressure, with live steam. Evolution of $CO_2$ and $NH_3$ and precipitation of copper oxide results. The stripped effluent is then filtered. Thereby, the necessary water to be discarded is separated out. The precipitated solids, including the copper oxide is returned to the system usually by redissolving, as will be more fully noted below.

The remaining portion of the fluid, that used for absorption, is preferably of the stripped $NH_3$, cooled to below about 90° F. It is passed through a packed tower, or a mechanical equivalent, countercurrently to a stream of the stripped gases. Substantially all of the $NH_3$ is dissolved. However, according to this invention, it has been found that rates of absorption for $CO_2$ and $NH_3$ differ sufficiently so that 95% of the ammonia can be dissolved, while dissolving only about 10% of the carbon dioxide. The undissolved gases are treated also with cold water to pick up any remaining $NH_3$, and an additional small portion of $CO_2$. However, the overall result is the evolution of sufficiently more $CO_2$ in the stripper than will be redissolved to deliver the necessary amount of $CO_2$ to be removed from the overall system.

In many cases, the correct amount of water will be discharged from the filter to balance the cycle. If more water must be discharged, additional $CO_2$ must be evolved in the final cold water scrubber. However, this amount may be added back at any convenient point, for example in the oxidizing tower. Conversely, if more $CO_2$ need be evolved, additional $H_2O$ may be discarded through the filter and the additional water may be returned at any convenient subsequent point.

Discharge from the ammonia reabsorption operation usually will be found to be at about 140°–145° F. This is the fluid used to redissolve the copper oxide precipitated in the stripper. As was noted above, this copper oxide now constitutes a major part of the solids in the filter sludge.

Leach liquor which is to be returned to the dissolving tanks will be a composite made up of spent leach solution and the return ammonia-copper solution obtained after the $H_2O-CO_2$ removal operation just discussed. These two liquors, usually but not necessarily commingled, are subjected to oxidation. Again it is desirable to operate below about 90° F. to favorably influence the absorption rates. Cooled liquors are passed through a suitable oxidizer, usually a packed tower, countercurrently to a stream of air, oxygen, or oxygen-enriched air. Some ammonia will be driven off. This is again redissolved in cold water in a separate operation and is added to the oxidized liquid effluent.

While the foregoing discussion has been principally concerned with copper, not all scrap metals requiring treatment constitute pure copper. Some is copper clad steel. This presents no difficulty as the iron is unreacted by the copper ammonium carbonate solution. Other scraps may contain zinc, lead, tin or nickel, for example.

Zinc, for example, will form zinc carbonate which is soluble in ammonia leach solutions. Zinc, then, will build up to some concentration determined by input and output. Where it is necessary to remove zinc and other like dissolved metals, a modification of the flow is desirable. Probably, the most convenient method of removing the zinc carbonate and the like is to divide the flows before pure copper precipitation. A portion of leach liquor is subjected to a complete copper precipitation regardless of purity. This precipitate is recycled, preferably to the cupric-cuprous reduction. Precipitation is done exactly as that discussed above except that it is carried to completion. Heating should continue for a considerably longer period of time than, and as noted, usually to a temperature above that normal for the step of precipitating only so much copper as comes down pure. If so desired, liquor remaining after the 70% precipitation and wash water from that fraction may be added to this circuit. Ordinarily this need not be done. The zinc carbonate is in the remaining solution along with carbon dioxide and ammonia and is thereby removed. Usually a continuous flow thru this purging side circuit is maintained.

It has been found by actual practice that the portion of the copper which precipitates between 70% and 100% total copper reduction is less pure than the copper which precipitates at or below 70% total copper reduction. Therefore, in this side circuit a separation will be made whereby all of the copper precipitating between 0 and 100% or, alternatively, if a part of the liquor after 70% precipitation is added thereto, between 70% and 100%, will be separated from the zinc removal liquor flow and be turned back to the leaching or reduction vessels for redissolving.

This separation is accomplished by first cooling the mixture of metallic copper and liquor and then relieving the liquor to atmospheric pressure. Copper is filtered out or the mixture is then allowed to settle. Clear liquor containing zinc carbonate, $CO_2$ and ammonia can be decanted. Decanted liquor and/or filtrate is processed in a stripping still to recover $NH_3$ in a similar manner to that described previously. The effluent from this still will contain zinc carbonate and water. The zinc carbonate may be separated by any conventional means and the water discarded. In this manner, a portion or all of the water which is required to be discarded in the process may be eliminated. The stripped gases are then taken up in one of the flows returning to leaching or reduction.

Lead will partially dissolve as lead carbonate soluble in ammonia. The balance will form a sludge in the leaching tanks, along with tin and rare metals. These may be recovered. A portion of the soluble lead will be reduced with the copper in some cases. Proportionately, however, it precipitates much slower than copper, so ordinarily it will not all come down. Precipitated lead, if any, may be removed by a suitable reagent. This may be a soluble ferricyanide in a slightly acidic solution, the acid being selected from a group which forms soluble lead salts. It also may be removed with acetic acid, or a soluble acetate and an oxidizing reagent.

Nickel will dissolve to some extent along with copper and will be proportionately reduced. Like the lead, it may be washed from the copper. It will be removed by a weak sulfuric acid wash. Since the latter is ordinarily used to stabilize the copper, if for no other reason, this will be taken care of by normal operation. In the process of the present invention, the difficulty occasioned by nickel, cobalt and the like in the scrap is considerably reduced at the normal operating temperature, both in leaching and in copper metal production. In the present process both the leaching and the copper precipitation temperatures are well below the optimum conditions for these metals. Operating conditions are such that all the copper will be leached before all the nickel or cobalt can be dissolved, except when present in very small amounts proportionately to the copper.

We claim:

1. In recovering copper from copper-bearing material by leaching said material with an aqueous ammoniacal copper salt solution and chemically precipitating copper from the leach liquor; the improvement which comprises preparing an ammoniacal copper salt solution initially containing at least 20, but not more than about 110 grams of cupric copper per liter, and contacting the solution thus prepared with copper-bearing material at a velocity of about 0.01–5.0 feet per second over the surface.

2. A process according to claim 1, in which the leach liquor is contacted with the copper-bearing material at a velocity of from about 0.1–1.0 foot per second over the surface.

3. In recovering copper metal of high purity from copper-bearing material by leaching said material with an aqueous ammoniacal copper salt solution and chemically precipitating copper from the leach liquor, the improvement which comprises preparing an ammoniacal copper salt solution initially containing at least 20, but not more than about 110 grams of cupric copper per liter, and contacting the solution thus prepared with copper-bearing material at a velocity of about 0.01–5.0 feet per second over the surface, withdrawing spent leach liquor and treating withdrawn liquor with a substantially sulphur-free reducing gas for a time sufficient to effect precipitation only of copper powder at a purity of at least 99.9%.

4. In recovering copper metal of high purity from copper-bearing material by leaching said material with an ammoniacal copper salt solution and chemically precipitating copper from leach liquor, the improvement which comprises preparing an ammoniacal copper salt leaching solution containing from about 20 to about 110 grams of cupric copper per liter, contacting solution thus prepared with said material at a velocity of about 0.01–5.0 feet per second over the surface, whereby the total dissolved copper content of said solution is increased with an equivalent reduction of cupric to cuprous copper, while subjecting withdrawn leaching solution to sufficient oxidation to convert cuprous copper therein to cupric, returning oxidized liquor to the leaching operation and maintaining the rates of (a) flow through and (b) oxidation in said oxidizing circuit sufficiently high to maintain the cupric-cuprous ratio in said leaching solution at an active leaching level throughout said contacting operation.

5. In recovering copper metal of high purity from copper-bearing material by leaching said material with an ammoniacal copper salt solution and chemically precipitating copper from the leach liquor, the improvement which comprises contacting an ammoniacal copper salt leaching solution initially containing from about 20 to about 110 grams of cupric copper per liter with said material at a velocity of about 0.01–5.0 feet per second over the surface, whereby the total copper content of said solution is increased with an equivalent reduction of cupric to cuprous copper while subjecting withdrawn leaching solution to sufficient oxidation to convert cuprous copper therein to cupric, returning oxidized liquor to the leaching operation and maintaining the rates of (a) flow through and (b) oxidation in said oxidizing circuit sufficiently high to maintain the cupric-cuprous ratio in said leaching solution at an active leaching level, treating additional withdrawn leaching solution at increased pressure and above about 250° F., with a substantially sulphur-free reducing gas for a time sufficient to effect partial precipitation of only copper powder of at least 99.9% purity and recycling any copper not so precipitated from the solution, thereby obtaining in a series of cycles substantially complete recovery of all leached copper as a metal powder of at least 99.9% purity.

6. A process according to claim 5 in which said leaching solution is contacted with the copper-bearing material at a velocity of about 0.1–1.0 foot per second over the surface.

7. A process according to claim 5 in which the effective reducing component of said reducing gas is carbon monoxide.

8. In recovering copper metal of high purity from copper-bearing material by leaching said material with an ammoniacal copper salt leaching solution initially containing from about 20 to about 110 grams of cupric copper per liter with said material at a velocity of about 0.01–5.0 feet per second over the surface, whereby the total copper content of said solution is increased with an equivalent reduction of cupric to cuprous copper, while subjecting withdrawn leaching solution to sufficient oxidation to convert cuprous copper therein to cupric, returning oxidized liquor to the leaching operation and maintaining the rates of (a) flow through and (b) oxidation in said oxidizing circuit sufficiently high to maintain the cupric-cuprous ratio in said leaching solution at an active leaching level; the improvement which comprises treating additional withdrawn leaching solution at increased pressure and above about 250° F., with a substantially sulphur-free reducing gas for a time sufficient to effect partial precipitation of only copper powder of at least 99.9% purity and recycling any copper not so precipitated from the solution, thereby obtaining in a series of cycles substantially complete recovery of all leached copper as a metal powder of at least 99.9% purity.

9. A process according to claim 8 in which at least a portion of said residual unprecipitated copper in solution after the initial precipitation of high-purity copper only is precipitated from solution before being recycled.

10. A process according to claim 8 in which after said precipitation of high purity copper, gases including ammonia are removed from at least a portion of said residual solution, thus removed ammonia is redissolved and unstripped residual solution and redissolved ammonia are recycled to the leaching operation.

11. A process according to claim 8 in which the partial precipitation of high purity copper only is effected within a temperature range of about 250°–350° F. and a second copper precipitation is carried out with additional amounts of said reducing gas within a temperature range of about 250°–400° F. and at least an equivalent pressure, so-precipitated copper of less than about 99.9% purity being recycled.

12. A process according to claim 11 in which after the second precipitation of copper, gases including ammonia are removed from at least a portion of said residual solution, thus removed ammonia is redissolved and unstripped residual solution and redissolved ammonia are recycled to the leaching operation.

13. A process according to claim 8, which includes the steps of stripping gases, including ammonia, from at least a portion of the residual solution after said precipitation of high purity copper; redissolving stripped ammonia; oxidizing at least a portion of any residual unstripped solution and returning redissolved ammonia and oxidized unstripped solution to the leaching operation.

14. A process according to claim 8, which includes the steps of stripping gases, including ammonia, from at least a portion of the residual solution after said precipitation of high purity copper; redissolving stripped ammonia and returning redissolved ammonia to the leaching operation.

15. A process according to claim 14 in which, prior to said stripping step, solution to be stripped is treated at increased pressure and at above about 250° F. with additional substantially sulfur-free reducing gas for sufficient time to effect substantially complete precipitation of copper, together with any concurrent precipitation of impurities and resulting precipitate is returned as copper-bearing material to the leaching operation.

16. A process according to claim 14 in which said stripping operation is carried out to the extent that substantially all dissolved copper and ammonia are removed from the stripped solution and copper and copper-bearing solids thus obtained are returned to the leaching operation.

LOUIS N. ALLEN, Jr.
PATRICK J. McGAULEY.
EDWARD S. ROBERTS.

References Cited in the file of this patent
UNITED STATES PATENTS

| Number | Name | Date |
|---|---|---|
| 1,131,986 | Benedict | Mar. 16, 1915 |
| 1,461,918 | Laist | July 17, 1923 |
| 1,516,356 | Taplin | Nov. 18, 1924 |
| 1,570,858 | Perkins | Jan. 26, 1926 |
| 1,686,391 | Muller et al. | Oct. 2, 1928 |
| 2,290,313 | Caron | July 21, 1942 |